United States Patent [19]

Duhon, Sr.

[11] Patent Number: 5,801,127
[45] Date of Patent: Sep. 1, 1998

[54] OLIVE PULP ADDITIVE IN DRILLING OPERATIONS

[76] Inventor: Jimmy J. Duhon, Sr., 9303 Romules Rd., Abbeville, La. 70510

[21] Appl. No.: 951,546

[22] Filed: Oct. 16, 1997

[51] Int. Cl.$^6$ ............................................. C09K 7/00
[52] U.S. Cl. ........................... 507/104; 507/204; 175/72
[58] Field of Search .......................... 507/104, 204; 175/72

[56] References Cited

U.S. PATENT DOCUMENTS

| | | | |
|---|---|---|---|
| 4,619,772 | 10/1986 | Black et al. | 507/104 |
| 5,087,611 | 2/1992 | Forrest | 507/104 |
| 5,102,866 | 4/1992 | Forrest | 507/104 |
| 5,229,018 | 7/1993 | Forrest | 252/8.551 |
| 5,229,019 | 7/1993 | Forrest | 252/8.551 |
| 5,246,602 | 9/1993 | Forrest | 252/8.551 |
| 5,363,928 | 11/1994 | Wittliff | 175/72 |
| 5,484,028 | 1/1996 | Rose | 507/104 |
| 5,599,776 | 2/1997 | Burts, Jr. | 507/104 |

OTHER PUBLICATIONS

Kirk–Othmer, Encyclopedia of Chemical Technology, vol. 7, $2^{nd}$ Edition, pp. 297–299, (1965).

Primary Examiner—Philip Tucker
Attorney, Agent, or Firm—Roy, Kiesel & Tucker

[57] ABSTRACT

A drilling fluid additive is provided including ground olive pulp. The ground olive pulp is prepared by drying olive pulp to remove residual water, and then grinding the pulp to a desirable particle size. The pulp is preferably ground to particle sizes of less than about 1500 microns. In a preferred embodiment, 90 percent of the particles are less than about 100 microns in size and 50 percent of the particles are less than about 30 microns in size. The ground olive pulp can be added to oil or water-based drilling fluids. The preparation and use of waste olive pulp as a drilling fluid additive provides an environmentally safe method for disposing of waste olive pulp.

19 Claims, No Drawings

OLIVE PULP ADDITIVE IN DRILLING OPERATIONS

BACKGROUND OF THE INVENTION

1. Field of the Invention.

This invention relates to drilling fluids for use in oil wells, and particularly to drilling fluid additives to prevent fluid loss, lost circulation, damage to well bores, and associated problems encountered with the use of drilling fluids.

2. Prior Art.

During the drilling of oil wells and the like, drilling fluid or drilling mud is circulated in the well bore to remove foreign matter from the well, to lubricate the well pipe to ease rotation, and to power drill bits. The lubrication properties of drilling fluids reduce the amount of power necessary to rotate the drill pipe and increase the speed and efficiency of drilling operations. After a well bore has been drilled, another type of drilling fluid, known as completion fluid, is used to bring production on line and to hold back well pressures.

Because well bores typically extend deep into the ground, drilling fluids can have adverse effects on the subterranean formations encountered during drilling and production operations. Drilling fluids can also produce undesirable chemical reactions in the well bore, and are subject to fluid loss and lost circulation.

Fluid loss occurs when the fluid portion of the drilling fluid leaches into the surrounding subterranean formations, leaving the solid particulate portions of the drilling fluid in the well bore. When fluid loss occurs, the drilling fluid becomes more viscous, and a filter cake can form in the well bore. If the filter cake is allowed to build up to a certain point, the drill pipe becomes stuck, thus stopping drilling operations and perhaps leading to abandonment of the well. This problem leads to added expense during drilling operations.

Lost circulation occurs when both the solid and liquid components of the drilling fluid seep into formations and cavities surrounding the drill hole. When lost circulation occurs, more drilling fluid must be added to the well bore to carry the drill shavings to the surface and to maintain lubrication, adding expense to the drilling operations.

Both fluid loss and lost circulation can be prevented or reduced by adding certain types of particulate matter to drilling fluids. When circulated in drilling fluid in a well, such particles enter the pores of sands and micro fractures in the ground formation, plugging off leaks. In general, proportionately small particles are used to prevent fluid loss, while proportionately large particles are used to prevent lost circulation. Most drilling fluid additives contain a range of various particle sizes. The overall distribution of the various particle sizes in the drilling fluid can be important. For example, if a high proportion of proportionately large particles is used to prevent lost circulation, the fluid may be more prone to forming filter cakes if fluid loss occurs.

It has been found that organic materials can be used as drilling fluid additives to prevent fluid loss, lost circulation, adverse effects on formations, and undesirable chemical reactions in the well bore. For example, U.S. Pat. Nos. 5,087,611, 5,102,866, 5,229,018, 5,229,019, and 5,246,602 disclose using ground peanut hulls as an additive to drilling fluid. U.S. Pat. No. 5,363,928 discloses the use of a by-product of corn cobs known as "bees wings" as a drilling fluid additive. U.S. Pat. No. 4,247,403 discloses the use of ground corncobs as a drilling fluid additive. U.S. Pat. No. 5,076,944 discloses the use of cotton burs, ground oat hulls, ground corn cobs, hydrophobic organophilic water wettable cotton, ground citrus pulp, ground rice hulls, ground nut shells, and mixtures thereof as drilling fluid additives. U.S. Pat. No. 4,474,665 discloses the use of a cocoa bean shell material as a lost circulation controller for use in drilling fluids. Most of these organic additives are designed to prevent fluid loss and lost circulation, though they can also be used for other purposes such as low fluid leakoff cementing compositions and filtration control additives for well cement (U.S. Pat. No. 5,229,019), and compositions for fracturing subterranean formations (U.S. Pat. No. 5,246,602).

Many of the known organic drilling fluid additives are waste by-products. Thus, their use as drilling fluid additives has the advantage of providing a use for a waste product. Organic drilling fluid additives have other environmental benefits. By preventing lost circulation, organic additives help prevent drilling fluids from adversely effecting subterranean formations. Additionally, the use of biodegradable organic additives makes disposal of waste drilling fluids less expensive and less of an environmental concern.

Olive oil, which is widely used as a food additive, is produced by pressing olives. The pressing of olives to remove olive oil produces large quantities of waste olive pulp which must be disposed of properly. In the past, disposal was accomplished by burning the waste olive pulp. However, tighter environmental laws have decreased the feasibility of burning waste olive pulp for disposal purposes. Accordingly, an environmentally safe alternative for the disposal of olive pulp is desirable. The use of olive pulp as an additive to drilling fluid provides an environmentally safe method of disposal of significant quantities of olive pulp, while also providing drilling fluids which prevent fluid loss, lost circulation, adverse effects on formations, and undesirable chemical reactions in the well bore.

OBJECTS AND SUMMARY OF THE INVENTION

Therefore, it is an object of the present invention to provide an environmentally safe and less expensive drilling fluid additive.

It is a further object of the present invention to reduce well cake permeability.

It is a further object of the present invention to seal off underground formations and cavities to prevent fluid loss from the drilling fluid.

It is a further object of the present invention to prevent lost circulation by sealing off underground formations and cavities.

It is a further object of the present invention to provide an environmentally safe and inexpensive method for the disposal of waste olive pulp.

It is a further object of the present invention to decrease the cost and increase the efficiency of drilling operations.

It is a further object of the present invention to provide a drilling fluid additive which makes casing and logging run smoothly.

It is a further object of the present invention to provide a drilling fluid additive which is biodegradable and nontoxic.

It is a further object of the present invention to provide a drilling fluid additive which is stable and does not degrade at the temperatures encountered in drilling operations.

It is a further object of the present invention to provide a product and method for reducing bit balling, drag, and torque.

These and other objects and advantages of the invention shall become apparent from the following general and preferred descriptions of the inventions.

Accordingly, a drilling fluid additive is provided consisting of ground olive pulp. The ground olive pulp is prepared by drying olive pulp to remove residual water, and then grinding the pulp to a desirable particle size. The pulp is preferably ground to particle sizes of less than 200 microns. In a preferred embodiment, 90 percent of the particles are less than about 100 microns in size and 50 percent of the particles are less than about 30 microns in size. The ground olive pulp can be added to oil or water-based drilling fluids. If added to an oil-based drilling fluid, the ground olive pulp can be treated with mineral or other oil prior to being added to the drilling fluid. The ground olive pulp is added to drilling fluid in quantities of 4 to 50 pounds per 42 gallons of drilling fluid. The ground olive pulp can be added to the drilling fluid before the fluid is introduced into the well bore, or the pulp can be added directly to drilling fluid already in the well bore. The preparation and use of waste olive pulp as a drilling fluid additive provides an environmentally safe method for disposing of waste olive pulp.

DETAILED DESCRIPTION OF PREFERRED EMBODIMENTS OF THE INVENTION

Waste olive pulp from olive and olive oil processing is obtained. Waste olive pulp can be obtained from Nick Sciabica's & Sons, 2150 Yosemite Avenue, Modesto, Calif. 95354. The waste olive pulp typically contains residual olive oil, about 50 percent by weight water, and residual amounts of olive pits.

The waste olive pulp is preferably dried to remove residual water. The pulp can be dried using conventional methods and equipment, such as a Louisville Steam Turbo Dryer. The pulp is preferably dried until about 3 percent by weight water remains in the pulp. If too much residual water is removed, the olive pulp will burn. After drying, the olive pulp contains about 14 percent by weight residual olive oil.

The dried olive pulp is then ground using conventional methods well known to a person of ordinary skill in the art. The pulp is preferably ground to particle sizes of less than about 1500 microns. Conventional sizing methods, such as screening, are used to obtain a desired particle size or a distribution of particle sizes. For most applications, a particle size of less than about 200 microns is desirable. However, where lost circulation occurs, such as when large pores or fractures are encountered in the subterranean formations of the well bore, it may be preferable to provide a powder in which the particles are between about 800 to about 1500 microns in size. In experimental testing, favorable results have been obtained using ground pulp in which 90 percent of the particles are less than about 100 microns in size and 50 percent of the particles are less than about 30 microns in size. The preferred particle sizes and distributions can be used in all types of drilling fluids, including completion fluids. The preferred size and distribution of particles may vary depending on drilling and formation conditions. The ground and dried olive pulp has a specific gravity of approximately 0.7 to 0.77.

The ground olive pulp can be treated with an oil prior to being added to the drilling fluid. Treating the ground olive pulp with an oil causes the fibers to more readily enter solution in oil-based drilling fluids, and to remain suspended and evenly dispersed in the fluid. However, the residual olive oil contained in ground olive pulp provides solubility, and makes treatment of the ground pulp optional. The methods of treating with an oil are well known in the field of drilling fluid additives. One method is to spray the ground olive pulp with a treatment oil in a dry mixing tank having spray bars, followed by blending of the sprayed particles. Mineral oil is a preferred treatment oil.

After drying, grinding, and the optional treatment with oil, the ground olive pulp is placed in containers and taken to a well site to be added to drilling fluid. The ground olive pulp is added to the drilling fluid in quantities ranging from about 4 to about 50 pounds of ground olive pulp per 42 gallon barrel of drilling fluid, depending on well conditions. For most applications, about 6 to about 8 pounds of ground olive pulp are added per 42 gallons of drilling fluid. However, in high fluid loss situations, upwards of 50 pounds per barrel may be required in order to stop fluid losses. Completion fluids typically require less ground pulp than regular drilling fluids. The ground olive pulp can be added to the drilling fluid before the fluid is introduced into the drill string and well bore, or it can be added directly to drilling fluid already in the drill string and well bore. With the ground olive pulp and drilling fluid in the drill string and well bore, drilling or completion is carried out using conventional techniques well-known to those skilled in the art. During drilling operations or completion procedures, the olive pulp particles enter the pores of sands and micro fractures in the ground formation, plugging off leaks. The particles may then swell, thus further sealing off the formation.

An acceptable formulation for one 42 gallon barrel of an oil-based drilling fluid is 6 pounds of ground pulp, 27.2 gallons diesel oil, 5.8 gallons 30 percent $CaCl_2$ solution, 6 gallons of a primary emulsifier, 3 gallons of a secondary emulsifier, 3.5 pounds of lime, 8 pounds of organoclay, and 138 pounds of barite. This formulation yields a drilling fluid having a density of about 10.5 pounds per gallon.

An acceptable formulation for one 42 gallon barrel of a water-based drilling fluid is 6 pounds of ground olive pulp, 38 gallons water, 20 pounds bentonite, 6 pounds lignite, 0.5 pounds caustic, 0.75 pounds drispac, 118 pounds barite. This formulation yields a drilling fluid having a density of about 10.5 pounds per gallon.

The particle size of the ground olive pulp and the amount of ground olive pulp needed will be determined by the applicable well and drilling conditions, including the size and type of the underground formations and cavities encountered during the drilling operations. In general, formations with large pores require larger sized particles.

The residual olive oil in the olive pulp is believed to contribute to the lubrication properties of the drilling fluid. The residual olive oil thereby provides an advantage not available in the materials disclosed in the prior art.

The exact chemical reaction of the ground olive pulp in the drilling fluid and in the subterranean strata is not known. However, ground olive pulp minimizes adverse chemical effects in the well bore, reduces friction on the drill pipe, and prevents fluid loss and lost circulation. Additionally, because olive pulp is organic and biodegradable, its use as a drilling fluid additive makes disposal of waste drilling fluids less expensive and less of an environmental concern.

As noted above, large quantities of olive pulp are produced as a waste by-product of olive oil processing. In the past, the favored method of disposing of olive pulp was burning. However, environmental laws now make burning expensive or, in some locations, prohibited. It is therefore necessary to develop environmentally safe methods for disposing of olive pulp. As can be appreciated, the methods disclosed herein for processing olive pulp and using the processed pulp as a drilling fluid additive provide an environmentally safe means of disposing of waste olive pulp. Under typical drilling conditions, approximately 30,000 pounds of drilling fluid additives are used in drilling an average length well of 10,000 feet. In high fluid loss situations, such as where drilling fluid additives are used in amounts of 40 to 50 pounds per 42 gallons of drilling fluid, much larger quantities of drilling fluid additive may be required. With modern directional drilling techniques, numerous horizontal well bores may be drilled off of an original well bore, thus requiring further quantities of drilling fluid additives over the life of the well. From time to time, completion fluids will be introduced into the well to bring production on line, thus requiring further quantities of drilling fluid additives. In all of these operations, ground olive pulp can be used in place of existing drilling fluid additives. Considering that thousands of wells are drilled and operated around the world, it can be appreciated that the use of ground olive pulp as a drilling fluid additive represents a significant potential use of existing supplies of waste olive pulp, as well as a practical solution to an existing environmental problem.

Although the preferred embodiments have been described, it will be appreciated by those skilled in the art to which the present invention pertains that modifications, changes, and improvements may be made without departing from the spirit of the invention defined by the claims.

I claim:

1. A drilling fluid for use in the drilling of wells, said drilling fluid including ground olive pulp.

2. The drilling fluid according to claim 1, wherein said ground olive pulp is present in a concentration of about 4 to 50 pounds per 42 gallons of said drilling fluid.

3. The drilling fluid according to claim 1, wherein said ground olive pulp comprises olive pulp particles of less than about 1500 microns in size.

4. The drilling fluid according to claim 1, wherein said ground olive pulp comprises olive pulp particles of less than about 200 microns in size.

5. The drilling fluid according to claim 4, wherein 90 percent of said olive pulp particles are less than about 100 microns in size and 50 percent of said olive pulp particles are less than about 30 microns in size.

6. A method for improving drilling fluid comprising the steps of:

providing olive pulp;
grinding said olive pulp into olive pulp particles; and
adding said ground olive pulp to a drilling fluid.

7. The method according to claim 6, wherein about 4 to 50 pounds of ground olive pulp are added per 42 gallons of said drilling fluid.

8. The drilling fluid according to claim 6, wherein said ground olive pulp comprises olive pulp particles of less than about 1500 microns in size.

9. The method according to claim 6, wherein said olive pulp particles are ground to less than about 200 microns in size.

10. The method according to claim 9, wherein 90 percent of said olive pulp particles are ground to less than about 100 microns in size and 50 percent of said olive pulp particles are ground to less than about 30 microns in size.

11. The method of claim 6, further comprising the step of drying said olive pulp prior to grinding said olive pulp.

12. The method of claim 6, further comprising the step of treating said ground olive pulp with oil prior to adding said ground olive pulp to said drilling fluid.

13. A method for disposal of olive pulp comprising the steps of:

providing olive pulp;
grinding said olive pulp into olive pulp particles; and
adding said ground olive pulp to a drilling fluid.

14. The method according to claim 13, wherein about 4 to 50 pounds of ground olive pulp are added per 42 gallons of said drilling fluid.

15. The drilling fluid according to claim 13, wherein said ground olive pulp comprises olive pulp particles of less than about 1500 microns in size.

16. The method according to claim 13, wherein said olive pulp particles are ground to less than about 200 microns in size.

17. The method according to claim 16, wherein 90 percent of said olive pulp particles are ground to less than about 100 microns in size and 50 percent of said olive pulp particles are ground to less than about 30 microns in size.

18. The method of claim 13, further comprising the step of drying said olive pulp prior to grinding said olive pulp.

19. The method of claim 13, further comprising the step of treating said ground olive pulp with oil prior to adding said ground olive pulp to said drilling fluid.

* * * * *